US009866035B2

(12) United States Patent
Doughty et al.

(10) Patent No.: US 9,866,035 B2
(45) Date of Patent: Jan. 9, 2018

(54) ROTATABLE COUPLING

(71) Applicant: iRobot Corporation, Bedford, MA (US)

(72) Inventors: Brian Doughty, Framingham, MA (US); Steven Shamlian, Watertown, MA (US); Jeffrey Curtis, Dunstable, MA (US)

(73) Assignee: iRobot Corporation, Bedford, MA (US)

( * ) Notice: Subject to any disclaimer, the term of this patent is extended or adjusted under 35 U.S.C. 154(b) by 470 days.

(21) Appl. No.: 14/671,304

(22) Filed: Mar. 27, 2015

(65) Prior Publication Data
US 2016/0279808 A1 Sep. 29, 2016

(51) Int. Cl.
*B25J 19/00* (2006.01)
*H02J 5/00* (2016.01)
*G01D 5/347* (2006.01)

(52) U.S. Cl.
CPC .......... *H02J 5/005* (2013.01); *G01D 5/34738* (2013.01); *Y10S 901/01* (2013.01); *Y10S 901/28* (2013.01)

(58) Field of Classification Search
CPC ..... G01D 5/34738; G01D 5/347; H02J 5/005; H02J 5/00; B25J 19/00; B25J 17/00; B25J 9/16; B25J 19/0041; B25J 19/0045; B25J 19/0029; B25J 9/1697; Y10S 901/01; Y10S 901/28
USPC ........................................... 310/179–210, 89
See application file for complete search history.

(56) References Cited

U.S. PATENT DOCUMENTS

| | | | |
|---|---|---|---|
| 3,355,801 A | 12/1967 | Priddy | |
| 3,757,190 A | 9/1973 | Shelley | |
| 4,398,113 A | 8/1983 | Lewis et al. | |
| 4,871,935 A | 10/1989 | Sweet et al. | |
| 4,992,691 A | 2/1991 | Mlynarz | |
| 5,453,931 A * | 9/1995 | Watts, Jr. ............. | G05D 1/0231 180/168 |
| 5,691,687 A | 11/1997 | Kumagai et al. | |
| 5,923,114 A | 7/1999 | Senni | |

(Continued)

OTHER PUBLICATIONS

U.S. Appl. No. 14/512,098, filed Oct. 10, 2014, Robotic Lawn Mowing Boundary Determination.

(Continued)

*Primary Examiner* — Naishadh Desai
(74) *Attorney, Agent, or Firm* — Fish & Richardson P.C.

(57) ABSTRACT

A rotatable coupling includes an input housing rotatably coupled to an output housing by a tube fixed to the output housing and on which tube the input housing rotates. The coupling includes two magnetic flux concentrators disposed about the tube and defining therebetween an annular cavity, a first concentrator fixed to the input housing and a second concentrator fixed to the output housing, such that relative rotation of the housings causes relative rotation of the concentrators on either side of the annular cavity. The coupling includes concentric coils disposed within the annular cavity that permit power transfer across the coupling, a first coil fixed to the input housing and a second coil fixed to the output housing; an emitter fixed to the input housing; and a receiver fixed to the output housing and positioned to receive the signals from the emitter during the relative rotation of the housings.

20 Claims, 9 Drawing Sheets

(56) References Cited

U.S. PATENT DOCUMENTS

| | | | |
|---|---|---|---|
| 6,400,057 | B2 | 6/2002 | Vesper et al. |
| 6,437,475 | B1 | 8/2002 | Buck et al. |
| 7,415,758 | B2 | 8/2008 | Hauser et al. |
| 7,444,742 | B2 | 11/2008 | Sturm et al. |
| 7,523,540 | B2 | 4/2009 | Morel |
| 8,454,384 | B2 | 6/2013 | Islam et al. |
| 8,528,192 | B2 | 9/2013 | Jayko et al. |
| 8,583,282 | B2 | 11/2013 | Angle et al. |
| 8,868,237 | B2 | 10/2014 | Sandin et al. |
| 8,881,339 | B2 | 11/2014 | Gilbert et al. |
| 8,958,911 | B2 * | 2/2015 | Wong ............... G05D 1/024 700/258 |
| 9,479,732 | B1 * | 10/2016 | Saleh ............... H04N 5/3572 |
| 2003/0167647 | A1 * | 9/2003 | Raab ............... B23Q 35/04 33/503 |
| 2004/0169434 | A1 | 9/2004 | Washington et al. |
| 2011/0277775 | A1 * | 11/2011 | Holop ............... A61B 17/3423 128/849 |
| 2012/0232690 | A1 * | 9/2012 | Gilchrist ............... B25J 9/042 700/228 |
| 2014/0259475 | A1 | 9/2014 | Doughty |

OTHER PUBLICATIONS

U.S. Appl. No. 14/610,013, filed Jan. 30, 2015, Robotic Arm and Wrist Mechanisms.

* cited by examiner

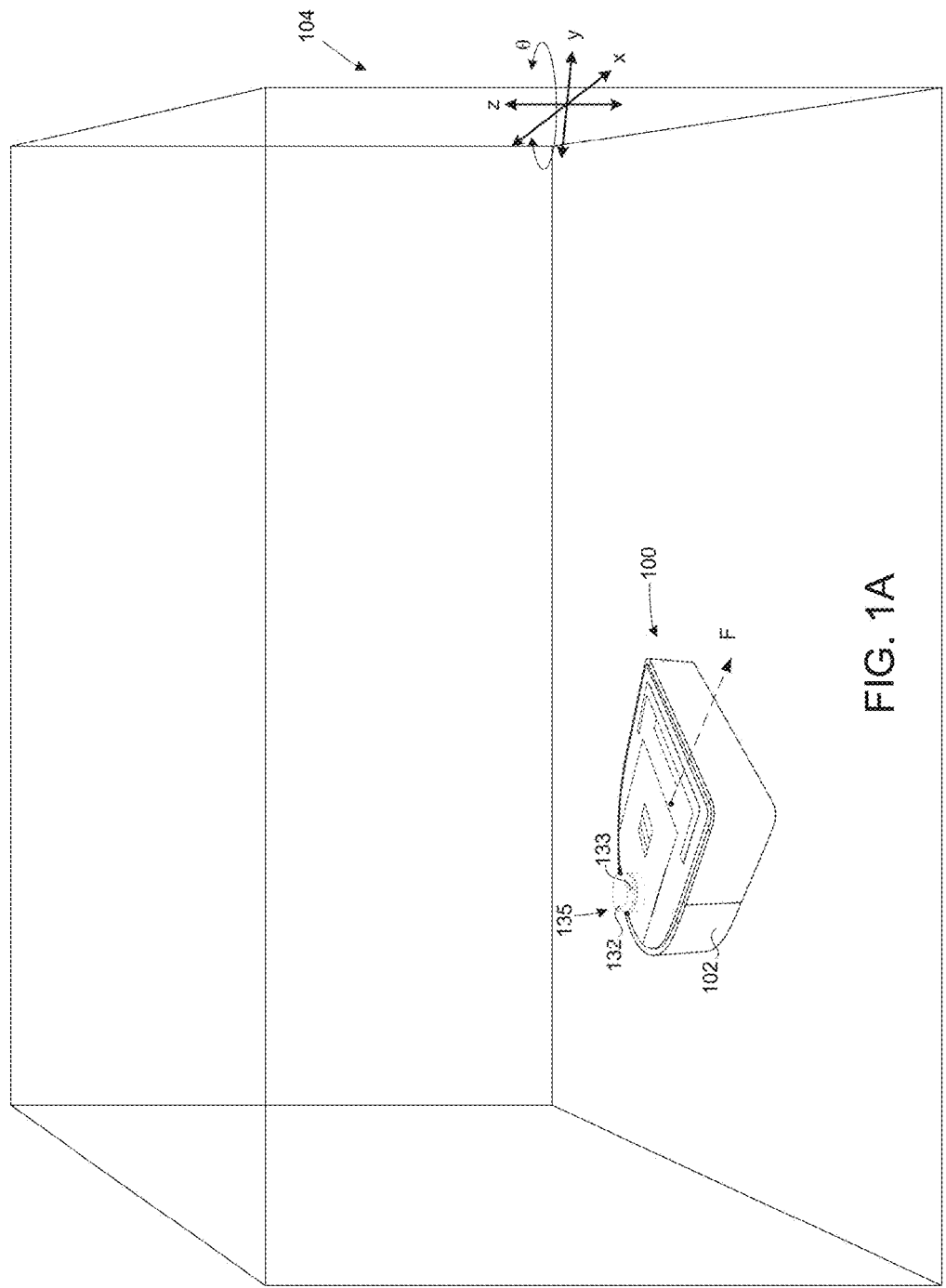

ROTATABLE COUPLING

TECHNICAL FIELD

This invention generally relates to rotatable couplings, such as those used in robotic systems for transmitting electrical power and/or signals across a continuously rotatable interface.

BACKGROUND

Robotic systems implement devices—such as sensors and end effectors—to learn about and manipulate their environment. Some robotic systems include a coupling that serves as a mechanical joint. The coupling can provide electrical and mechanical connection between the device and the rest of the robotic system. In some cases, the coupling is configured to allow the device to rotate continuously, or at least through more than a full revolution, relative to the rest of the system. Various means of transmitting signals and/or power across such couplings have included slip rings (which feature a sliding or rolling electrical contact) and winding/unwinding coiled conductors that provide a limited range of rotation, for example.

SUMMARY

One aspect of the invention features a continuously rotatable coupling including an input housing rotatably coupled to an output housing by a hollow tube fixed to the output housing and on which tube the input housing rotates. The hollow tube defines a central passage. The coupling includes two cooperating magnetic flux concentrators disposed about the tube and defining therebetween an annular cavity The flux concentrators include a first flux concentrator fixed to the input housing and a second flux concentrator fixed to the output housing, such that relative rotation of the input and output housings causes relative rotation of the flux concentrators on either side of the annular cavity. The coupling includes concentric coils disposed within the annular cavity and positioned to permit electrical contact-free power transfer across the coupling. A first of the concentric coils is fixed to the input housing and a second of the concentric coils is fixed to the output housing. The coupling further includes an optical data emitter fixed to the input housing and positioned to transmit optical signals through the central passage and an optical data receiver fixed to the output housing and positioned to receive the optical signals from the input optical data emitter during the relative rotation of the input and output housings.

In some implementations, the first concentric coil is fixed to the first flux concentrator and the second concentric coil is fixed to the second flux concentrator. The concentric coils can be arranged such that a magnetic field induced by an alternating current passing through the second concentric coil will induce an electromotive force within the first concentric coil. An oscillating waveform passing through the second concentric coil can electromagnetically couple the first concentric coil with the second concentric coil.

In some examples, the optical data transmitter fixed to the input housing includes a first optical data transceiver and the optical data transmitter fixed to the output housing includes a second optical data transceiver, such that the first and second optical data transceivers are configured to pass signals in both directions through the central passage. The first optical data transceiver can be a first emitter and receiver pair, and the second optical data transceiver can be a second emitter and receiver pair. The optical data transmitter can include an infrared emitting diode.

In some cases, a distance between a surface of the first flux concentrator and a surface of the second flux concentrator is between approximately 0.1 mm to 1 mm.

The coupling can include an encoder coupled to the hollow tube and responsive to rotational displacement of the input housing relative to the hollow tube. The rotatable coupling can include a rotatable joint of an articulating arm. The rotatable coupling can be configured to be disposed on an autonomous robot. In some cases, a controller of the autonomous robot controls movement of the autonomous robot based on the optical signals.

In some examples, a continuously rotatable sensor turret, includes the rotatable coupling, with the output cavity fixed to a base. The turret includes a directional sensor carried by the input housing and having an active sense window that sweeps about an environment as the coupling is rotated. The concentric coils can be configured to provide electrical power to the sensor during rotation of the coupling, and the optical data transmitter and receiver can be configured to transmit a signal from the sensor across the central passage during rotation of the coupling. In some implementations, the coupling includes a directional beam transmitter carried by the input housing and configured to emit a sensing signal into the environment while the coupling rotates, wherein the sensor is responsive to reflections of the emitted sensing signal. The beam transmitter can include a laser. The coupling can include a radar transmitter carried by the input housing and configured to emit a radar signal into the environment while the input housing rotates, and the sensor is responsive to reflections of the emitted radar signal. The directional sensor can be a camera configured to receive image data about the environment as the coupling is rotated. In some cases, the sensor is a radiation transceiver.

In some cases, the coupling further includes a power source mounted on a flyback converter board disposed in the output housing. The flyback converter board can be configured to deliver power across the coupling to the directional sensor.

Another aspect of the invention features an autonomous robot, including a chassis and a continuously rotatable sensor turret disposed on the chassis. The continuously rotatable sensor turret includes a rotatable coupling, a directional sensor, and a controller. The rotatable coupling includes an input housing rotatably coupled to an output housing by a hollow tube fixed to the output housing and on which tube the input housing rotates. The hollow tube defines a central passage. The coupling includes two cooperating magnetic flux concentrators disposed about the tube and defining therebetween an annular cavity The flux concentrators include a first flux concentrator fixed to the input housing and a second flux concentrator fixed to the output housing, such that relative rotation of the input and output housings causes relative rotation of the flux concentrators on either side of the annular cavity. The coupling includes concentric coils disposed within the annular cavity and positioned to permit electrical contact-free power transfer across the coupling. A first of the concentric coils is fixed to the input housing and a second of the concentric coils is fixed to the output housing. The coupling further includes an optical data emitter fixed to the input housing and positioned to transmit optical signals through the central passage and an optical data receiver fixed to the output housing and positioned to receive the optical signals from the input optical data emitter during the relative rotation of the input and output housings. The directional sensor is carried by the input housing and has an active sense window that sweeps about an environment as the coupling is rotated. The controller configured to control movement of the autonomous robot based on signals received from the directional sensor. The concentric coils are configured to provide electrical power to the sensor during rotation of the coupling, and the optical data transmitter and receiver are configured to transmit a signal from the sensor across the central passage during rotation of the coupling.

Various implementations of the rotatable coupling can provide a relatively inexpensive and reliable means of rotating sensors, actuators, and end effectors relative to a main body of a robotic system while transmitting power and/or data across the coupling. Use of the low-loss rotary transformer configuration described below can provide power coupling with acceptably low transmission losses.

In some cases, the coupling can be configured to receive various electromechanical devices—such as sensors, actuators, and end effectors—modularly attached and detached from the rotating coupling for different uses or applications. In addition to expanding the versatility of components usable with the robotic system, such a coupling allows the attached device to easily rotate relative to the rest of the robotic system such that the device can be quickly re-oriented without mechanically adjusting the orientation of the robotic system.

The details of one or more implementations are set forth in the accompanying drawings and the description below. Other features, objects, and advantages of the invention will be apparent from the description and drawings, and from the claims.

DESCRIPTION OF DRAWINGS

FIG. 1A is a perspective view of an autonomous robot with a rotatable coupling with a sensor module navigating in a region.

Like reference symbols in the various drawings indicate like elements.

DETAILED DESCRIPTION

A robot with a power system, a drive system, a navigation system, and a sensing system navigates around a region, which can be, for example, a room in a house, a lawn, an academic institution, an office, or a wilderness area. The drive system can rotate the robot such that a forward drive direction of the robot rotates as well. One or more boundaries—for example, virtual and physical boundaries—can confine the robot to navigate within the region. The region can further contain obstacles located within the confines of the boundaries. As the robot navigates around the region, the features of the region—for example, the boundaries and the obstacles—can be located in various directions relative to the forward drive direction of the robot. The sensing system can include sensors disposed on the robot to detect features of the region, such as the boundaries or the obstacles. The object detection system using one or more sensors is disposed on a chassis of the robot. These sensors can include, for example, a camera, a wideband (WB) transceiver, a radio transceiver, an infrared (IR) laser transceiver, and/or some other radiation transceiver known in the art. The sensors, such as the laser-based sensors and the camera, can be directional (e.g., the orientation of the sensors can determine the area of the region that the sensor is sensing.). Each sensor can be coupled to a coupling that allows the sensor to rotate relative to the robot. The coupling includes both a stationary portion fixed to the robot and a rotatable portion coupled to the sensor. The coupling can orient the sensor to an angle relative to the forward direction of the robot. As described in more detail below, data and power can be transmitted to and received from the rotatable portion of the coupling while it rotates relative to the stationary portion of the coupling. Likewise, data collected from the sensor can be transmitted to the stationary portion.

Overview of Example Robot

Figure 1B:
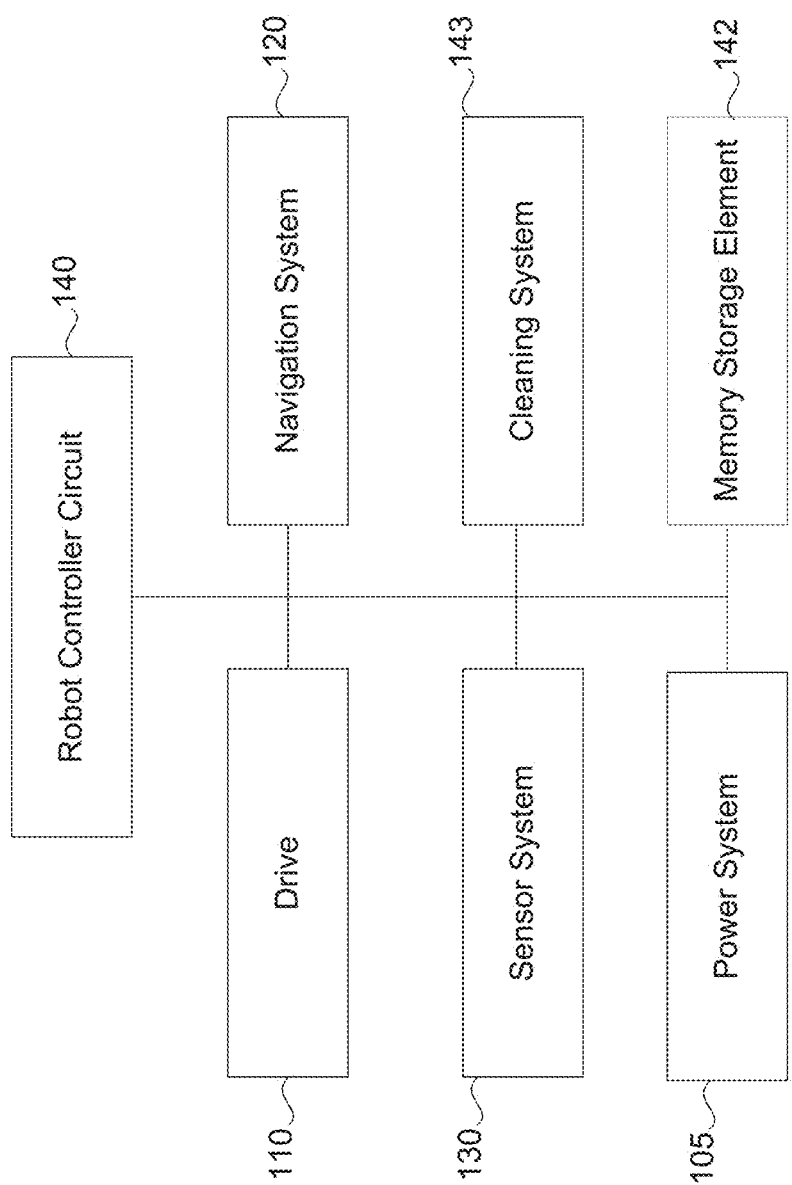
FIG. 1B is a block diagram of electromechanical systems of the autonomous robot of FIG. 1A.

FIG. 1A shows an exemplary autonomous cleaning robot 100 with a body 102. The robot 100 is navigating a region 104. Now also, referring to FIG. 1B, the body 102 of the robot 100 houses a power system 105, a drive 110 (herein also referred to as a "drive system") with left and right wheel modules (not visible and on the bottom of the robot body 102), a navigation system 120, a sensor system 130 with a sensor module 132 having a sensor 133 disposed on a data and power coupling 135, a controller 140, and a memory storage element 142. In the implementation as depicted in FIG. 1, the robot 100 is an autonomous cleaning robot with a cleaning system 143, such as that disclosed in US Patent Publication No. 2014/0259475 filed on Mar. 15, 2013 and titled "Roller Brush For Surface Cleaning Robots", which is incorporated herein by reference in its entirety. The region 104 can be, for example, a room that robot 100 regularly navigates around. As will be described below in more detail, the coupling 135 includes a rotatable portion and a stationary portion having electrical and mechanical components that facilitate transfer of power and data between the rotatable portion and the stationary portion. The stationary portion is fixed to the robot 100. It should be understood that the technical features of the current application can be applied widely to other robotic systems, examples of which are described in detail below.

The power system 105, which includes a power source, provides electric power to the systems operable with the robot. The power system 105 can adjust the power source to provide a percent of full power. The power system 105 can further include a charging system within the power system 105 that is connectable to an external charging dock to charge the power source. As described below with respect to FIG. 2B, the power system 105 and the coupling 135 are configured such that the power system 105 can deliver power to the rotatable portion of the coupling 135.

The drive system 110 includes motors to drive wheels of the wheel modules such that the wheel modules can propel the robot 100 in a forward drive direction F. The wheel modules can be differentially operated such that the robot 100 can turn or reorient itself based on a level of drive supplied to each wheel. Independent motors (not shown) of the wheel modules drive each wheel such that the wheels can rotate independently from one another. As a result, independent rotation of the wheels can turn the robot 100 to rotate relative to the forward drive direction F. In some implementations, the drive system 110 includes a caster wheel (not shown) that partially supports the weight of the robot 100. The navigation system 120, a behavior-based system executed on the controller circuit 140 (herein also referred to as the "controller" 140), can send instructions to the drive system 110 so that the robot 100 can use the drive system 110 to navigate around the region 104.

The navigation system 120 can receive information related to features of the region 104 from the sensor system 130 to determine a mode or behavior to use to navigate about the region 104. The sensor system 130—having several different types of sensors—can be used to generate data related to the features, which the navigation system 120 can, in turn, use to navigate about the region 104. The sensor system 130 creates a perception of the robot's environment sufficient to allow the robot 100 to make intelligent decisions about actions to take in the region 104. The sensor system 130 can include obstacle detection obstacle avoidance (ODOA) sensors, communication sensors, navigation sensors, contact sensors, a laser scanner, and an imaging sonar etc. The sensor system 130 can also include ranging sonar sensors, proximity cliff sensors, clearance sensors operable with the clearance regulators, contact sensors operable with the caster wheel, and a bumper sensor system that detects when a bumper on the robot 100 encounters an obstacle. Additionally or alternatively, the sensor system 130 may include sensors not limited to proximity sensors, sonar, radar, LIDAR (Light Detection And Ranging, which can entail optical remote sensing that measures properties of scattered light to find range and/or other information of a distant target), etc., infrared cliff sensors, contact sensors, a camera (e.g., volumetric point cloud imaging, three-dimensional (3D) imaging or depth map sensors, visible light camera and/or infrared camera), etc. The sensor system 130 can include an obstacle sensing system that further includes the proximity sensors disposed on the robot 100 such that the robot can detect when it has made contact with a physical obstacle or when it is in close proximity to a physical obstacle. The proximity sensors can take the form of contact sensors (e.g. a sensor that detects an impact of a bumper on the robot with a physical barrier) and/or non-contact sensors (e.g., laser, LIDAR, volumetric point cloud sensor, sonar, ultrasound, etc.) that detect when the robot is in close proximity to nearby objects. The sensor system 130 includes the sensor 133 fixed to a rotating portion of the rotatable coupling 135, described below. In one implementation, the sensor 133 is a laser scanner. In another implementation, the sensor 133 is an IR laser transceiver that is used to perform LIDAR scanning to determine the range of features in the environment of the region 104.

The robot further includes the rotatable coupling 135 with an upper housing 155 (shown in FIG. 2A) disposed on an upper portion of the coupling 135 and a lower housing 160 (also shown in FIG. 2A) interfacing with a lower portion of the rotatable coupling 135. The lower housing 160 can include a drive mechanism (e.g., a motor) to rotate the upper housing 155 relative to the lower housing 160. The lower housing 160 is fixed to the robot body 102. As a result, when the upper housing 155 rotates relative to the lower housing 160, the upper housing 155 further rotates relative to the robot body 102. In some implementations, the drive mechanism can be part of the drive system 110 of the robot 100.

In general, the coupling 135 accepts a module having a sensor, actuator, manipulator, end effector, or other robotic device. In FIG. 1A, the sensor module 132, which includes the sensor 133, connects to the coupling 135. The sensor module 132 of the sensor system 130 is disposed on the upper housing 155, which continuously rotates relative to the rest of the coupling 135. The sensor module 132, coupled to the upper housing 155, therefore rotates relative to the robot 100. By rotating the coupling 135, the robot 100 can use the sensor 133 of the sensor module 132 to scan around the region 104 and detect features of the region 104 without rotating or re-orienting the robot 100. The controller 140 of the robot 100 can use signals from the sensor 133 to navigate about the region 104. For example, the signals can indicate a location of obstacles in the region 104, and the controller 140 use the signals to instruct the robot 100 to avoid the location of the obstacles. The signals can also help the controller 140 generate a map of the region 104.

While rotating, the upper housing 155 can simultaneously receive power from the power system 105 through a power transfer mechanism described in detail below with respect to FIG. 2B. The sensor 133 (fixed to the upper housing 155) can communicate with the controller 140 (fixed to the robot body 102). For example, the sensor 133 can deliver signals to the controller 140 while the upper housing 155 rotates. Likewise, the controller 140 can deliver signals through the coupling 135 to the sensor module 132. The upper housing 155 can be considered an input housing for the coupling 135. The upper housing 155 houses the sensor 133, which produces signals in response to detecting features from the surrounding environment of the robot 100. The upper housing 155 therefore receives the inputs for the sensor 133 attached to the coupling 135. The upper housing 155 then delivers signals from the sensor 133 to the lower housing 160, which in turn delivers the signals from the coupling 135 to the robot 100 for the robot 100. The robot 100 navigates and executes a particular mission, action, etc. in response to a received sensor signal. The upper housing 155 can therefore be considered an output housing of the coupling 135 for transferring a sensor data signal to the robot controller circuit 140

The controller circuit 140 operates the other systems of the robot 100 by communicating with each system, providing and receiving input and output parameters. For example, the controller 140 can instruct the power system 105 to provide electrical power to the motors of the drive 110 to move the robot 100 in the forward drive direction F. In an embodiment, the controller circuit 140 operates the navigation system 120 configured to maneuver the robot 100 in a path or route stored in the memory storage element 142. The controller 140 can further receive and process sensed signals and information detected by the sensor system 130. The controller circuit 140 can operate the coupling 135 and the electromechanical components of the sensor module 132, such as the sensor 133.

In one example, the controller circuit 140 can instruct the navigation system 120 and the drive system 110 to cooperate to turn the robot 100 by independently driving each wheel. The controller circuit 140 can further facilitate communication between the navigation system 120, the sensor system 130, and the drive 110 so that the navigation system 120 can issue drive commands to the drive 110 based on information gathered by the sensor system 130. The controller circuit 140 can include obstacle detection and avoidance methods and behaviors implemented in response to sensor signals from the sensor system 130. The robot 100 can use its proximity sensors to detect the geometry, distance, and heading of an obstacle in the general vicinity of the robot 100 so that the robot 100 can determine the direction to turn to avoid the obstacle. For example, using proximity sensors disposed on the front portion of the robot 100, the controller circuit 140 can determine when the robot 100 is about to contact an obstacle and communicate instructions to the navigation system 120 and the drive 110 to avoid the obstacle.

The electromechanical systems and robotic behaviors disclosed and illustrated herein may include the systems and routines as disclosed in U.S. patent application Ser. No. 13/460,261, filed Apr. 30, 2012, titled "Robotic Vacuum," U.S. patent application Ser. No. 11/688,213, filed Mar. 19, 2007, titled "Robot Confinement," and U.S. Ser. No. 14/512,098 filed on Oct. 10, 2014 and titled "Robotic Lawn Mowing Boundary Determination," the disclosures of which are incorporated by reference herein in their entireties.

Data and Power Coupling

Figure 2A:
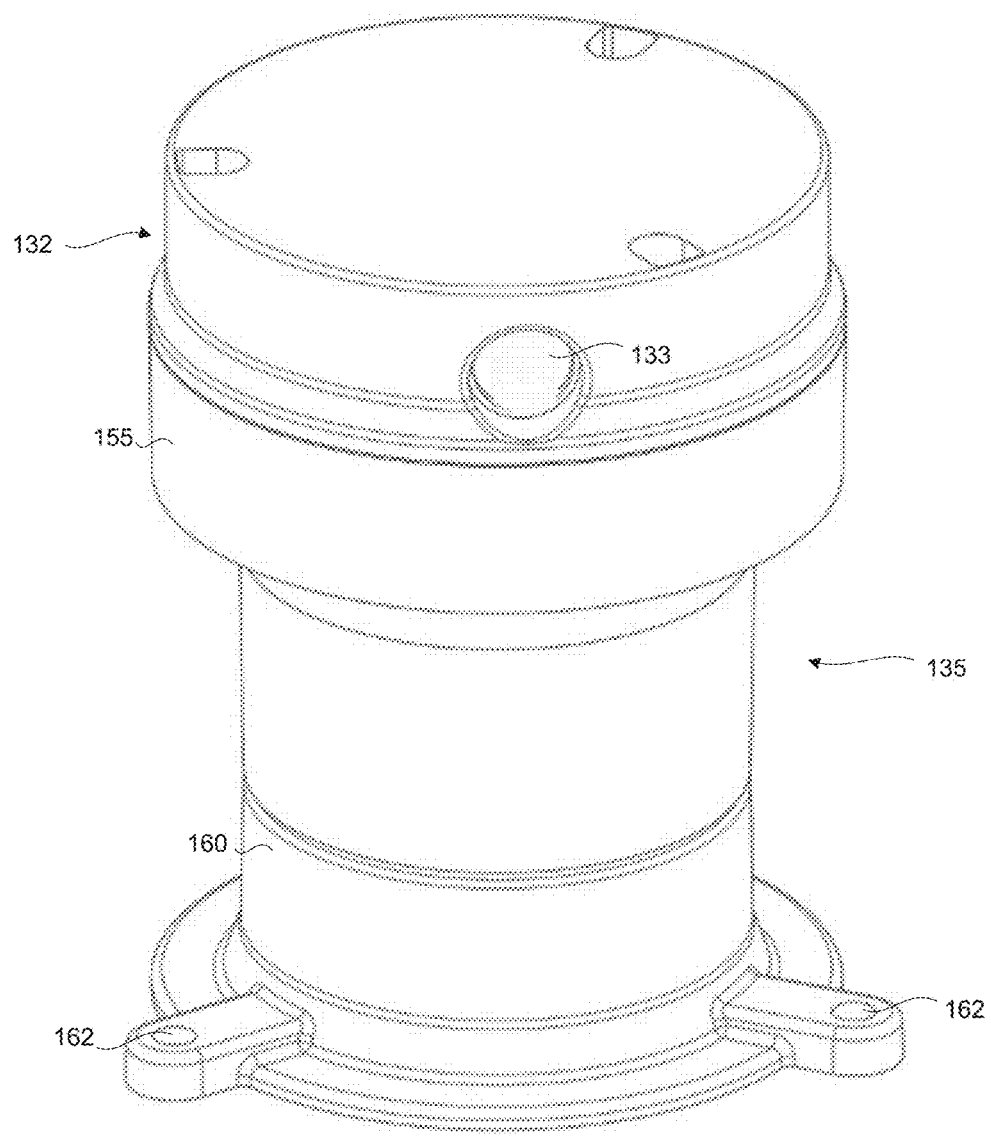
FIG. 2A is a perspective view of the coupling with the attached sensor module shown disposed on top of the autonomous robot of FIG. 1A.

FIG. 2A shows a perspective view of the coupling 135, which includes the upper housing 155 coupled to the sensor module 132 and the lower housing 160. The lower housing 160 is fixed to the body 102 of the robot 100 (shown in FIG. 1A). Referring briefly back to FIG. 1A, the coupling 135 can be sunken into the robot 100 such that the lower housing 160 is substantially within the robot body 102. Fasteners (not shown) can couple the lower housing 160 to the body 102 of the robot 100 using fastening holes 162 located at the base of the lower housing 160. The upper housing 155 can rotate relative to the lower housing 160. The sensor module 132 connects to the upper housing 155 such that rotating the upper housing 155 causes the sensor module 132 to rotate. The coupling 135 allows the robot 100 to rotate the sensor module 132 (and thus the sensor 133) without rotating the body 102 of the robot 100. As a result, the robot 100 does not need to modify the forward drive direction F of the robot to re-orient the sensor module 132.

Figure 2B:
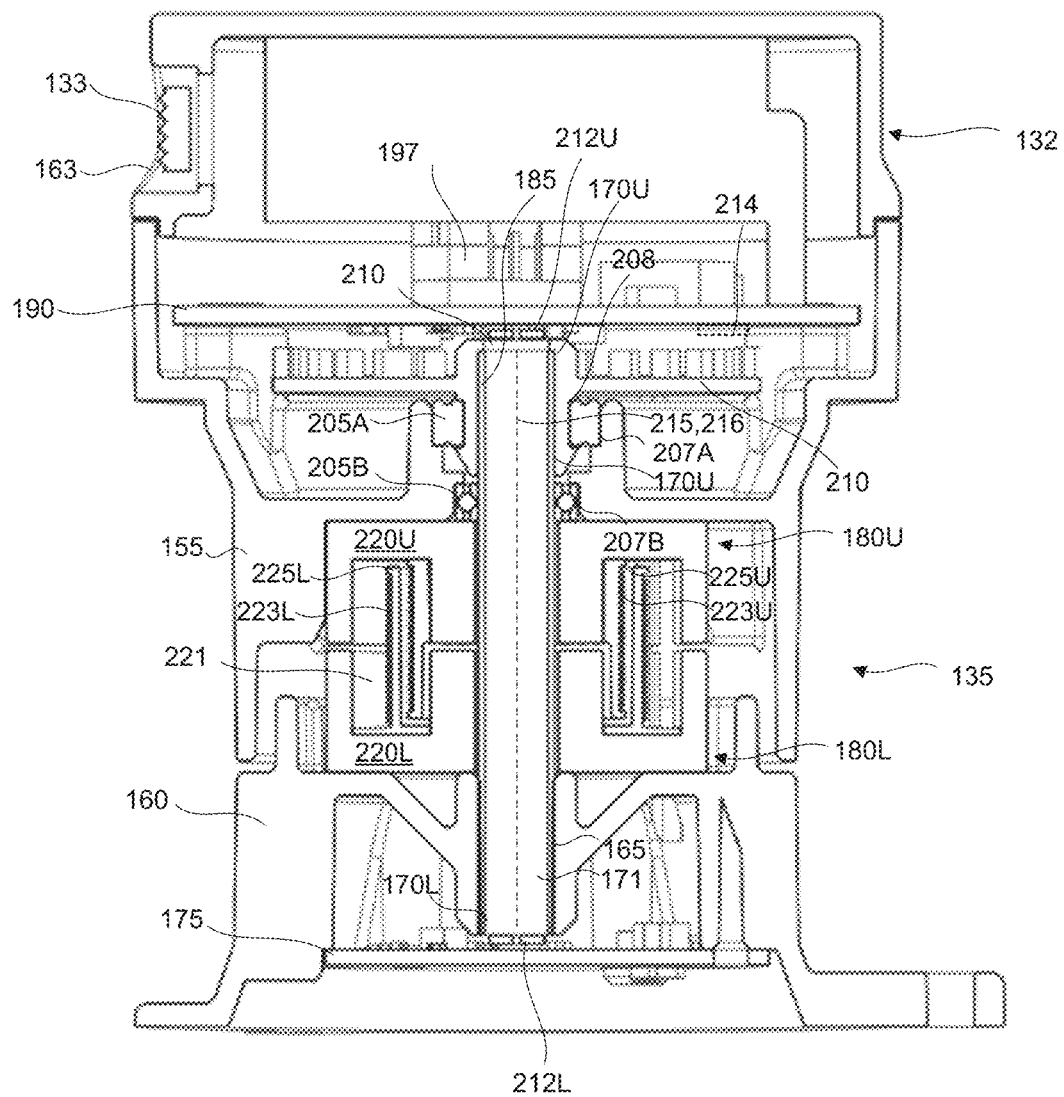
FIG. 2B is a front cross-section of the coupling of FIG. 2A.

FIG. 2B shows a front cross-sectional view of the coupling 135 with the sensor module 132 mounted on the coupling 135. In the cross-sectional view as shown, it should be understood that many of the components (e.g., the lower housing 160, the upper housing 155) are substantially axisymmetric. As described above, the lower housing 160 is fixed to the body 102 of the robot 100. The lower housing 160 includes a lower bore 165 sized and dimensioned to receive a hollow tube 170. The lower housing 160 further houses a lower circuit board 175 and lower coil assembly 180L. The components housed in the lower housing 160 (e.g., the lower circuit board 175 and the lower coil assembly 180L) are fixed to the lower housing 160. The hollow tube 170 is disposed within lower bore 165. The upper housing 155 includes an upper bore 185 to receive the hollow tube 170. The upper bore 185 is coaxial with lower bore 165. The upper housing 155 houses an upper circuit board 190 and an upper coil assembly 180U, both of which are fixed to the upper housing 155. The upper circuit board 190 includes a connector 197 (more easily appreciated in FIG. 2C) that connects to the sensor module 132 to transmit data bi-directionally and supply power to the sensor module 132 from a power circuit in the lower housing 160. In one implementation the power circuit is a flyback converter providing regulated power to the sensor 133. The connector 197 electrically connects the sensor module 132 to the upper housing 155. The hollow tube 170 has an upper end 170U received by the upper bore 185, a lower end 170L inserted into the lower bore 165. The upper bore 185 provides clearance around the hollow tube 170 such that the rotatable upper housing 155 is configured to rotate about the hollow tube 170 without frictional interference. The hollow tube 170 further defines a central passage 171. In some implementations, the lower end 170L of the hollow tube 170 is fixed to the lower bore 165 with mechanical fasteners such as adhesive, screws, detents, snap fits, or press fit to ensure that the hollow tube 170 does not rotate within the lower bore 165 and remains stationary relative to the lower housing 160. In the implementation of FIG. 2B, the hollow tube 170 can have an outer diameter of approximately, for example, 2 mm to 20 mm. In some implementations, the hollow tube 170 has an outer diameter of 5 mm. The lower end 170L of the hollow tube 170 is pressed into the bore 165 of the lower housing 160 and therefore is fixed to the lower housing 160. The interface between the lower end 170L of the hollow tube 170 and the bore 165 is an interference fit in which the outer diameter of the hollow tube 170 is greater than the diameter of the bore 165. As a result, the hollow tube 170 does not rotate relative to the lower housing 160. An optical encoder disc 210, pressed onto the upper end 170U of the hollow tube 170, in conjunction with two optical gates integrated in the upper circuit board 190, detects rotational motion of the upper housing 155 relative to the stationary lower housing 160. The upper end 170U of the hollow tube 170 supports the optical encoder disc 210. The optical encoder disc 210 is fixed to the hollow tube 170 (and thus the lower housing 160 as well) and subsequently detects rotation of the upper housing 155 relative to the lower housing 160.

The upper housing 155 is rotatable about the hollow tube 170, which thus serves as an axle for the upper housing 155. As a result, when the upper housing 155 rotates about the hollow tube 170, the upper housing 155 rotates relative to the lower housing 160. Bearings 205A and 205B permit low-friction rotation of the upper housing 155 about the hollow tube 170 and the optical encoder 200. In some implementations, the bearings 205A and 205B are ball bearings. Bearing bores 207A and 207B on the upper housing 155 receive the respective bearings 205A and 205B. The optical encoder disc 214 includes an insert 208 that receives the bearing 205A. The bearing 205A slides over the bottom portion of the optical encoder disc 210 and snaps into the insert 208 of the optical encoder disc 210. The bearing 205A thus provides a low-friction interface between upper housing 155 and the optical encoder disc 210 as the upper housing 155 rotates. Likewise, the bearing bore 207B that receives the bearing 205B provides an additional low-friction interface between the upper housing 155 and the hollow tube 170. The bearing bore 207B also partially supports the upper housing 155.

Rotation of the upper housing 155 rotates the upper circuit board 190, the upper coil assembly 180U, and the sensor module 132 coupled to the upper circuit board 190 and the upper housing 155. The lower housing 160 (the stationary housing) remains fixed as the upper housing 155 (the rotatable housing) rotates, and the lower circuit board 175, the lower coil assembly 180L, the hollow tube 170, and the optical encoder disc 210 consequently remain fixed during rotation of the upper housing 155. For many applications, the upper housing 155 rotates at a rotational speed between 10 and 400 RPM with respect to the lower housing 160. In some implementations, the upper housing 155 rotates at 300 RPM.

As described below, the hollow tube 170—in addition to serving as an axle about which the upper housing 155 rotates—functions as a conduit for optical radiation carrying data signals. An upper optical emitter and receiver pair 212U on the upper circuit board 190 and a lower optical emitter and receiver pair 212L on the lower circuit board 175 communicate with one another by transmitting optical signals along an optical path 215 in the central passage 171 of the hollow tube 170. In some implementations, the optical emitter and receiver pairs 212U, 212L are an IR light-emitting diode (LED) and an IR photodetector and control signals for the sensor 133 are transmitted up the central passage 171 of the hollow tube 170 and data from the sensor 133 is transmitted down the central passage 171 of the hollow tube 170. In some cases, the emitter and receiver pairs 212U, 212L are optical transceivers that can emit and detect radiation. The optical path 215 traverses the hollow tube 170 so that light can travel from the upper end 170U to the lower end 170L and vice versa. The lower and upper optical emitter and receiver pairs 212L and 212U are located along an axis of rotation 216 of the rotatable coupling 135 so that, when the upper housing 155 rotates relative to the stationary lower housing 160, the optical emitter and receiver pairs 212L and 212U can communicate with one another. The optical path 215 can overlap with the axis of rotation 216 of the coupling 135. In some implementations, the optical emitter and receiver pairs 212U, 212L are capable of transmitting data at a rate of up to 2 MBaud communicating both up and down simultaneously.

In one implementation, the robot 100 uses the sensor 133, such as a camera or laser, to detect the position and orientation of physical (and in some implementations, virtual) features of the region 104 relative to an origin and/or robot pose. The sensor 133 of the sensor module 132 detects the features of the region 104 by generating electrical signals in response to the features. The sensor 133 transmits the generated electrical signals to the upper optical emitter and receiver pairs 212U, which encodes the data into an optical signal that it emits through the optical path 215 to be received by the lower optical emitter and receiver pairs 212L. For example, in implementations, the emitter of the upper and lower emitter and receiver pairs 212U, 212L can be a Vishay Semiconductor high speed infrared emitting diodes, 940 nm, GaAlAs, MQW (part number: VSMB1940X01). In some implementations, the receiver of the upper and lower emitter and receiver pairs 212U, 212L can be a Vishay Semiconductor silicon PIN photodiode (part number: TEMD7100X01).

The upper optical emitter and receiver pair 212U on the upper circuit board 190 includes both an emitter and a receiver. The emitter of the upper optical emitter and receiver pair 212U converts the electrical signals generated by, for example, the sensor 133, into optical signals that the emitter delivers down the optical path 215. The receiver of the lower optical emitter and receiver pair 212L detects optical signals and converts those signals into electrical signals that, for example, a microprocessor on the lower circuit board 175 can send instructions to other components of the lower circuit board 175. As described above, the electrical signals that the upper optical emitter and receiver pair 212U receives can originate from the sensor 133. The upper optical emitter and receiver pair 212U is situated at the entrance at the upper end 170U of the hollow tube 170 such that the upper optical emitter and receiver pair 212U can emit optical signals along the optical path 215 and receive optical signals also sent along the optical path 215.

The lower optical emitter and receiver pair 212L, similar to the upper optical emitter and receiver pair 212U, on the lower circuit board 175 also includes both an emitter and a receiver. The emitter can also be an IR light-emitting diode (LED), and the receiver can be an IR photodetector. The emitter of the lower optical emitter and receiver pair 212L emits optical signals down the optical path 215, which the receiver of the upper optical emitter and receiver pair 212U receives and translates into electrical signals. The receiver of the lower optical emitter and receiver pair 212L receives optical signals sent down the optical path 215 by the emitter of the upper optical emitter and receiver pair 210U and converts those optical signals into electrical signals, which can be delivered to the controller 140 (described earlier with respect to FIG. 1B). The controller 140 can, for example, control movement of the robot 100 based on the optical signals.

In addition to transmitting data from the sensor 133, the upper optical emitter and receiver pair 212U can transmit data collected from an optical encoder 214 to the lower optical emitter and receiver pair 212L, which determines the position of the rotating upper housing 155 relative to the stationary lower housing 160. The encoder data of the optical encoder 214 can be used to accurately determine the rotational position of the rotating upper housing 155 and sensor module 132 mounted to upper housing 155 relative to the stationary lower housing 160. In some implementations, by sensing the direction of the upper housing 155 relative to the lower housing 160, the optical encoder 214 provides information relating to the orientation of the feature detected by the sensor 133 (which is coupled to the upper housing) relative to the stationary lower housing 160 and the robot 100 pose. In some implementations, if the sensor 133 is a laser or an IR time of flight sensor, the sensor 133 can determine the distance of objects and obstacles in the region 104 from the sensor 133. The controller 140 can process the orientation determined by the encoder 214 and the distance determined by the sensor 133 to locate an object in the region 104 relative to the robot 100 and relative to a robot pose with a global coordinate map. As both of the optical emitter and receiver pairs 212L and 212U have emitters and receivers, data in the form of optical signals can be transmitted in both directions along the optical path 215 within the central passage 171.

Turning now to other elements of the upper and lower housings 155, 160, the upper and lower housings each include coil assemblies 180U and 180L. The upper coil assembly 180U is fixed to the upper housing 155 and the lower coil assembly 180L is fixed to the lower housing 160. The upper and lower coil assemblies 180U and 180L cooperate to transmit power from the lower circuit board 175 to the upper circuit board 190. The electrical circuits of the lower circuit board 175 and the upper circuit board 190 are not in direct electrical contact with one another. The coil assemblies 180L and 180U provide a contact-free means of power transfer between the upper circuit board 190 and the lower circuit board 175. The lower coil assembly 180L includes a lower cup core 220L that fixes the coil assembly 180L to the lower housing 160. The upper coil assembly 180U includes an upper cup core 220U that fixes the upper coil assembly 180U to the upper housing 155. In some implementations, the upper cup core 220U and lower cup core 220L are ferrite. The cup cores 220L, 220U can each have outer diameters of approximately 20 mm to 30 mm. In some cases, the cup cores 220L, 220U have an outer diameter of 26 mm.

Figure 2C:
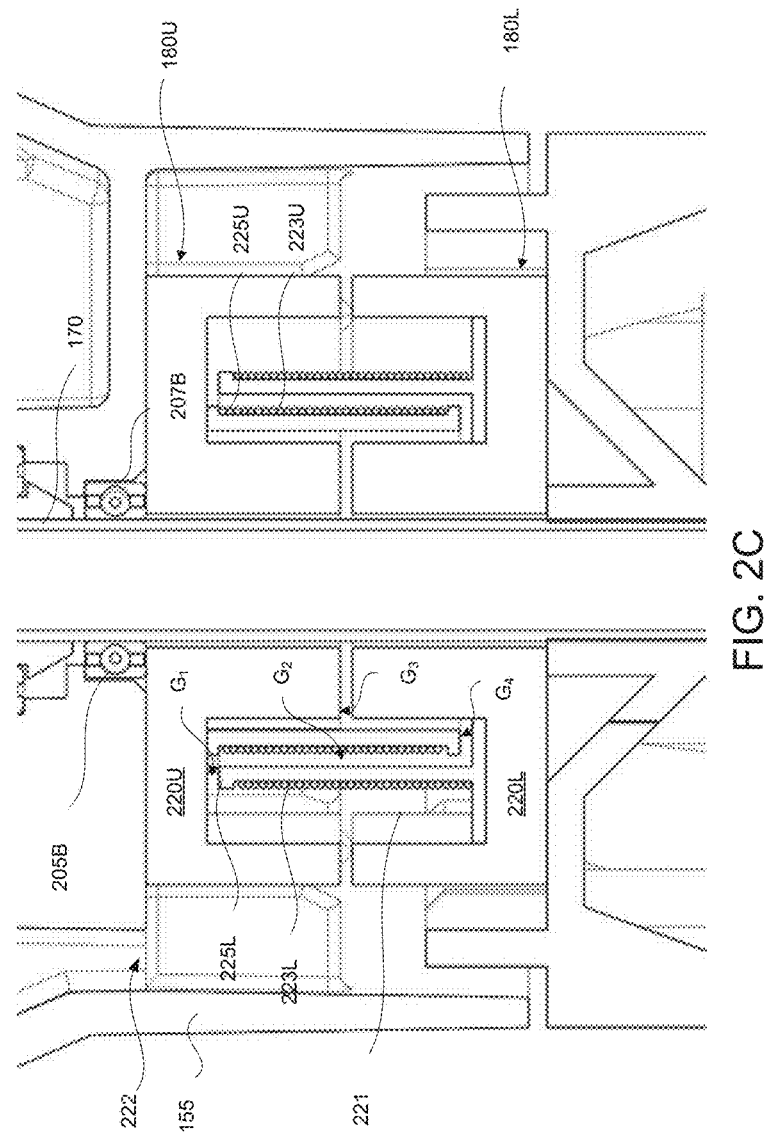
FIG. 2C is an enlarged side cross-section of coil assemblies of the coupling of FIG. 2A.

The cup cores 220L and 220U include an annular outer wall and an annular inner wall. An annular cavity 221 is therefore formed between the annular outer walls and the annular inner walls of the cup core 220L and 220U. As indicated in FIG. 2C showing an enlarged view of the upper and lower coil assemblies 180U, 180L, inside the annular cavity, each cup core 220L, 220U includes an annular coil 223L, 223U affixed to a coil bobbin 225L, 225U. In some implementations, the upper bobbin 225U and lower bobbin 225L are affixed, respectively, to the upper cup core 220U and lower cup core 220L and the upper annular coil 223U and lower annular coil 223L are copper windings spooled around their respective upper and lower bobbin 225U, 225L.

The annular coils 223L and 223U and their respective coil bobbin 225L, 225U typically form a single component. The annular coils 223L and 223U are disposed on either side (top side and bottom side) of the annular cavity. In one implementation, the coil bobbins 225L and 225U are press fit onto the inner walls of their respective cup cores 220L and 220U. In other implementations, the upper bobbin 225U and lower bobbin 225L are attached to upper and lower cup cores 220U, 220L respectively through other means such as heat welds, glue, or any number of mechanical fasteners such as screws, rivets, snap fits, etc.

Referring to FIGS. 2B-2C, each of the coils 223L and 223U, the coil bobbins 225L and 225U, and the cup cores 220L and 220U are rotationally symmetric about the center axis 216 that coincides with the center of the hollow tube 170. Thus, as the upper housing 155 rotates about the center axis 216, the upper coil 223U, the upper bobbin 225U, and the upper cup core 220U rotate about the axis 216 of rotational symmetry. Gaps $G_1$-$G_4$ between the coil assembly 180L and the coil assembly 180U (e.g., horizontally oriented gap $G_1$ between the cup core 220U and the annular coil 223L, vertically oriented gap $G_2$ between the upper annular coil 223U and the lower annular coil 223L, horizontally oriented gap $G_3$ between the cup core 220U and the cup core 220L, horizontally oriented gap $G_4$ between the annular coil 223L and the annular coil 223U,) eliminates contact between surfaces of the upper and lower coil assemblies 180U and 180L as the upper coil assembly 180U rotates relative to the lower coil assembly 180U. In some implementations, the upper cup core 220U fixed to the upper housing 155 is spaced apart from the lower cup core 220L fixed to the lower housing 160 by the gap $G_3$, having an air gap distance of 0.1 mm to 1 mm. Preferably, in some implementations, the air gap distance for the gap $G_3$ is about 0.5 mm. The upper bobbin 225U and lower bobbin 225L hold the upper copper coil 223U and lower copper coil 223L, respectively, spaced apart by the gap $G_2$, having an air gap distance of 0.1 to 1 mm. In some implementations, the vertical air gap distance for the gap $G_2$ is about 0.5 mm. The closer the spacing of the upper and lower coils 223U, 223L, the higher the efficiency of the power transfer between the coils 223U, 223L.

The coil 223U and the coil bobbin 225U form an inductor. Within the cores of the coils 223L and 223U, the magnetic permeability of the cup cores 220U and 220L are greater than the rest of the core. Some potential benefits of such a design are described below. The lower coil 223L is electrically connected to the lower circuit board 175, and the upper coil 223U is electrically connected to the upper circuit board 190. The reference voltage for one or both coils 223L and 223U can be floating. The upper and lower coils 223U and 223L can be connected to the upper and lower circuit boards 190 and 175, respectively, using electrical wires that traverse the upper and lower housings 155 and 160, respectively. Referring briefly to FIG. 2C, for example, the upper coil 223U can be electrically connected to the upper circuit board 190 by sending a wire through a gap 222 defined by the upper housing 155. Although not shown, the lower coil 223L can be connected to the lower circuit board 175 in a similar manner, where the lower housing 160 defines a gap to allow an electrical wire to connect the lower coil 223L to the lower circuit board 175.

Also described above, the cup cores 220L and 220U encompass the coils 223L and 223U. The cup cores 220L and 220U improve the efficiency of the power transfer from the coil 223L to the coil 223U by reducing losses caused by leakage flux. The cup cores 220L and 220U are made of a high-permeability and low-conductance material, such as ferrite. The cup cores 220L, 220U can be, for example, a Magnetics P26×16 Core (Part number 0F42616UG). Compared to the air in the core, the cup cores 220L and 220U have a greater magnetic permeability. Thus, the cup cores 220L and 220U are magnetic flux concentrators. When current passes through the coil 223L, which in turn generates the magnetic field, the flux of the magnetic field is concentrated at the regions of high magnetic permeability. As a result, the flux of the magnetic field is focused at the inner walls of the cup cores 220L and 220U, which are positioned close to the coils 223L and 223U. In some implementations, the configuration of the cup cores 220L and 220U and the coils 223L and 223U can achieve approximately, for example, 70%, 75%, and up to 80% efficiency of power transfer between the coils 223L and 223U.

The coils 223L and 223U form a rotary transformer. Alternating current passing through the coil 223L generates a varying magnetic field, which in turn induces an electromotive force, (a voltage,) in the upper coil 223U. The lower coil 223L therefore transfers power to the upper coil 223U. As described above, the efficiency of power transfer between the coils 223L and 223U can be improved by selecting appropriate sizes for the gap $G_4$ between the annular coil 223L and the annular coil 223U and the gap $G_3$ between the cup core 220U and the cup core 220L. The efficiency of power transfer can be also improved by introducing flux concentrating elements. As described above, the gaps $G_1$-$G_4$ denoted in FIG. 2B reduce the number of frictional contact surfaces. The gaps $G_1$-$G_4$ further increases the amount of air in the core, which can reduce the efficiency of the power transfer. The size of gaps $G_1$-$G_4$ can be selected to avoid physical contact between the coil assemblies 180L and 180U to reduce friction while minimizing the gap sizes to transfer power more efficiently. The gap $G_3$, for example, is sufficiently narrow to contain the magnetic flux within the cup cores 220U and 220L.

In some implementations, the coils 223L and 223U can form a flyback transformer. The lower circuit board 175 can be a flyback converter board that provides an oscillating waveform to the lower coil 223L. The gap $G_3$ is large enough to facilitate rotation of the upper coil assembly 180U relative to the lower coil assembly 180L to reduce inefficiencies caused by, for example, friction between the coil assemblies 180U, 180L. The gap $G_3$ is small enough so that, for example, the magnetic flux can be contained within the cup cores 220U, 220L. In some cases, a 12-30V input can achieve a regulated 5V output. As described above, in some implementations, the gap $G_3$ provides an air gap distance of approximately 0.1 mm to 1 mm (e.g., 0.1 mm, 0.25 mm, 0.5 mm, 1 mm). In other cases, the air gap distance is less than 0.1 mm (e.g., 0.01 mm, 0.03 mm, 0.05 mm).

Figure 2D:
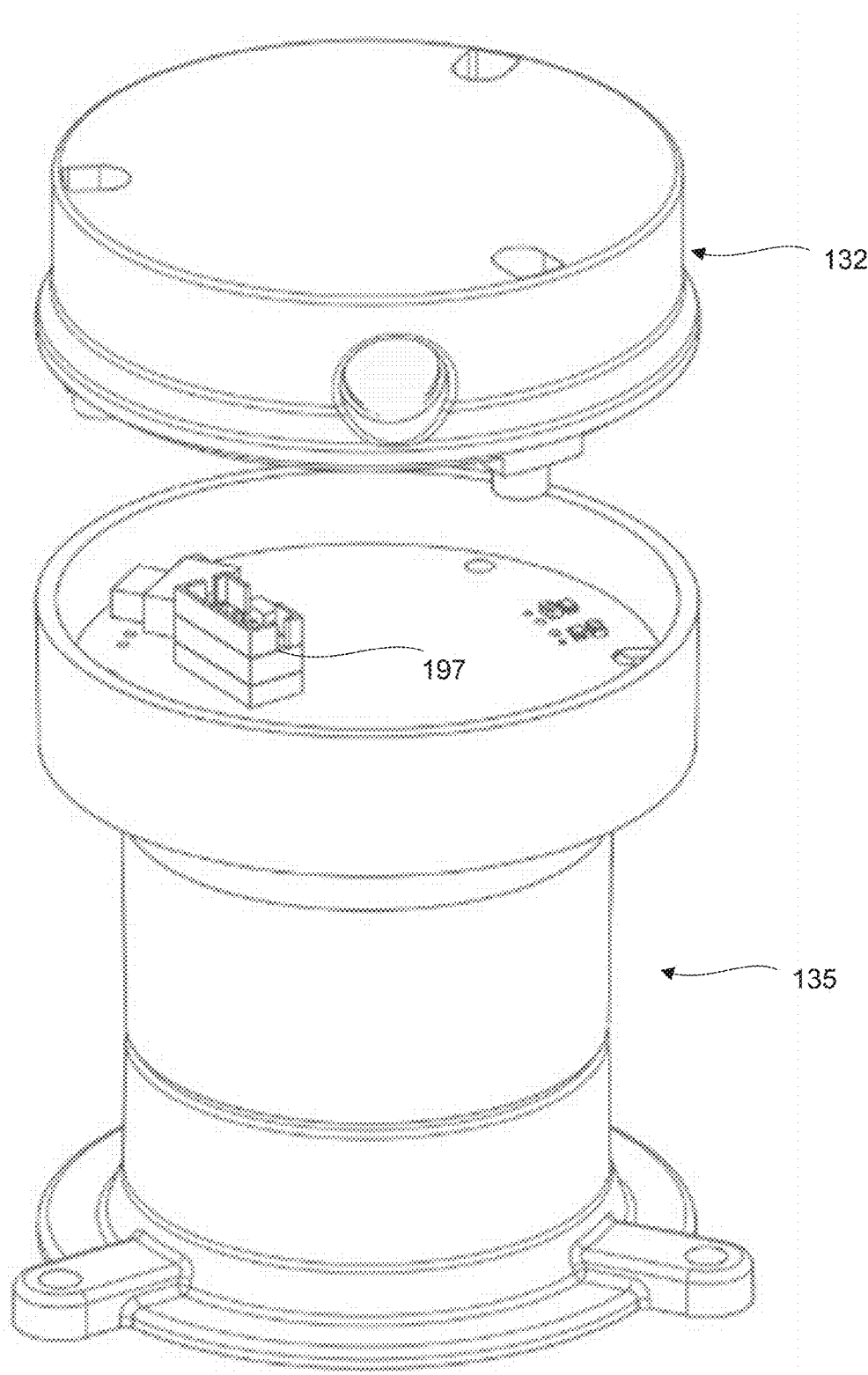
FIG. 2D is a perspective view of the coupling of FIG. 2A with the sensor module detached.

FIG. 2D shows the sensor module 132 detached from the coupling 135. The sensor module 132 physically and electrically connects to the coupling 135 via the connector 197. The connector 197 provides an easy-to-use interface so that modules with different capabilities can be easily exchanged depending on the use of the robot 100. The connector 197 allows an operator to easily attach and detach the module 132 from the coupling 135. The module 132 can include sensors, actuators, end effectors, and other hardware that can benefit from both power and data transfer capabilities between a continuously rotating portion and a stationary portion.

As mentioned above, the sensor module 132 can include one or more sensors 133. The sensors 133 can be, for example, an IR transceiver, a camera, sonar, stereo vision, radar, laser, or a LIDAR transceiver. In addition to placing sensors on the module 132 coupled to the coupling 135, actuators and end effectors can be integrated into the module 132. The actuators can be continuously rotated about the robot 100 and thus have greater flexibility in manipulating objects in the environment. For example, a hand end effector can be attached to the module 132. The coupling 135 permits the hand end effector to be continuously rotated so that the hand can grasp onto objects from varying orientations.

EXAMPLE IMPLEMENTATIONS

Robotic systems may include more than one coupling 135 as described above. While the robot 100 has been described as having electromechanical systems such as the power system 105, the drive system 110, the navigation system 120, the sensor system 130, the controller 140, and the cleaning system 143, it should be understood that the rotatable coupling can be implemented on robotic systems that include additional systems or can include only a subset of the systems described. For example, in an implementation of the rotatable coupling described below, a robot that serves as a robotic arm to manipulate objects does not use a cleaning system. Furthermore, while the coupling 135 has been described to be implemented on a robot (such as the robot 100), it should be understood that implementations of the coupling 135 can include other electromechanical systems.

While the drive system 110 has been described to include wheel modules, in other implementations, the drive system provides motors and actuators to drive other mechanical components. For example, in one implementation described below, the drive system actuates a robotic hand that can be used to manipulate objects in the environment. The drive may include other kinematic mechanisms to bestow motion to end effectors and other mechanical sub-systems of the robot.

While the coupling 135 has been described to be part of the sensor system 130, it should be understood that the coupling could be used for other systems of the robot as well. The coupling can be implemented into systems that transmit signals and/or power between two or more housings that rotate relative to one another.

While the coupling 135 has been shown to be disposed on top of the robot body 102, in other implementations, the coupling can be disposed on a bottom, lateral, or other portion of the robot body. For example, in one implementation described below, the coupling of a remote presence robot is disposed such that the coupling points toward the ground.

While the cup cores 220L and 220U have been described to be made of ferrite, in some implementations, the cup cores can be made of other magnetic materials with low electrical conductance. For example, the cup cores can be made of laminated metals such as iron or iron alloys.

While the lower end 170L of the hollow tube 170 has been described and shown to be coupled to the bore 165 of the lower housing 160 using an interference fit, in other implementations, the coupling between the bore can occur using other mechanical coupling mechanisms known in the art. For example, a snap fit engagement can couple the hollow tube with the lower housing. In some implementations, the hollow tube includes an outer layer that generates a friction fit between the tube and the bore.

While the upper housing 155 of the coupling 135 has been described to rotate at a rate of 10 to 400 RPM, in other implementations, the upper housing 155 can rotate slower or faster. For example, for a more accurate sensing of the environment, a sensor on the upper housing can slowly sweep around and scan the room at a rate slower than 10 RPM. In other implementations, a gross scan of the room can occur at rates faster than 400 RPM. Power transfer to the coupling can be increased to generate the faster motion. Since communication occurs using the optical emitter receiver pairs, faster rates of rotation do not affect the rate and fidelity of data transfer between the rotating upper housing and the robot.

In some implementations, multiple sensors can be housed in the sensor module. The sensors can be disposed on opposite sides of the sensor module such that the sensors can detect features on opposing sides of the region or environment. In other implementations, the module can include both an end effector and a sensor. The end effector allows the robot to manipulate objects in the environment, and the sensor allows the robot detect objects and features of the environment.

While the optical emitter receiver pair 212U on the upper circuit board 190 and the optical emitter receiver pair 212L on the lower circuit board 175 have been described to include both an emitter and a receiver, in other implementations, to transmit data from the upper circuit board to the lower circuit board, the upper circuit board includes an emitter and the lower circuit board includes a receiver. In such an implementation, data is transmitted uni-directionally from the upper circuit board to the lower circuit board.

While the optical encoder 214 has been described to be placed on the upper end 170U of the hollow tube 170, the position of the optical encoder can change in other implementations. Furthermore, other devices can be used to determine the rotational position of the upper housing relative to the lower housing. For example, a switching mechanism that the upper housing triggers upon a discrete amount of rotation can digitally determine the amount of rotation of the upper housing relative to the lower housing.

While the coils 223L and 223U are shown to have a similar number of windings in FIG. 2B, in some implementations, the coils can have a different number of windings. In such implementations, changing the number of windings can vary the impedance of each coil and thus the ratio of voltages passing through one coil and being induced in the other coil.

As described above with respect to FIG. 1A, in one implementation, the robot 100 can navigate around the region 104 using a laser or the time-of-flight IR transceiver 133 disposed on the coupling 135 to detect features of the region 104. The coupling 135 couples the IR transceiver 133 to the robot 100 such that the IR transceiver 133 can rotate relative to the robot 100. While the coupling 135 has been described to be part of the sensor system 130, it should be understood that the coupling could be used for other systems of the robot as well. It should be further understood that other non-radiative sensors could be used. For example, the sensors could be fiber optic whiskers that interact with the environment, mechanical cantilever force or pressure sensors, and other electromechanical or optical sensors known in the art. The module 132 that connects to the coupling 135 can include components besides sensors—such as actuators and end effectors—that can be implemented into, for example, a drive system, a navigation system, or other robotic systems. The coupling 135 can additionally be implemented on a number of different robotic devices. Combinations of alternative modules and robotic devices are described below with respect to FIGS. 3-5.

Example 1

Remote Presence Robot

Figure 3:
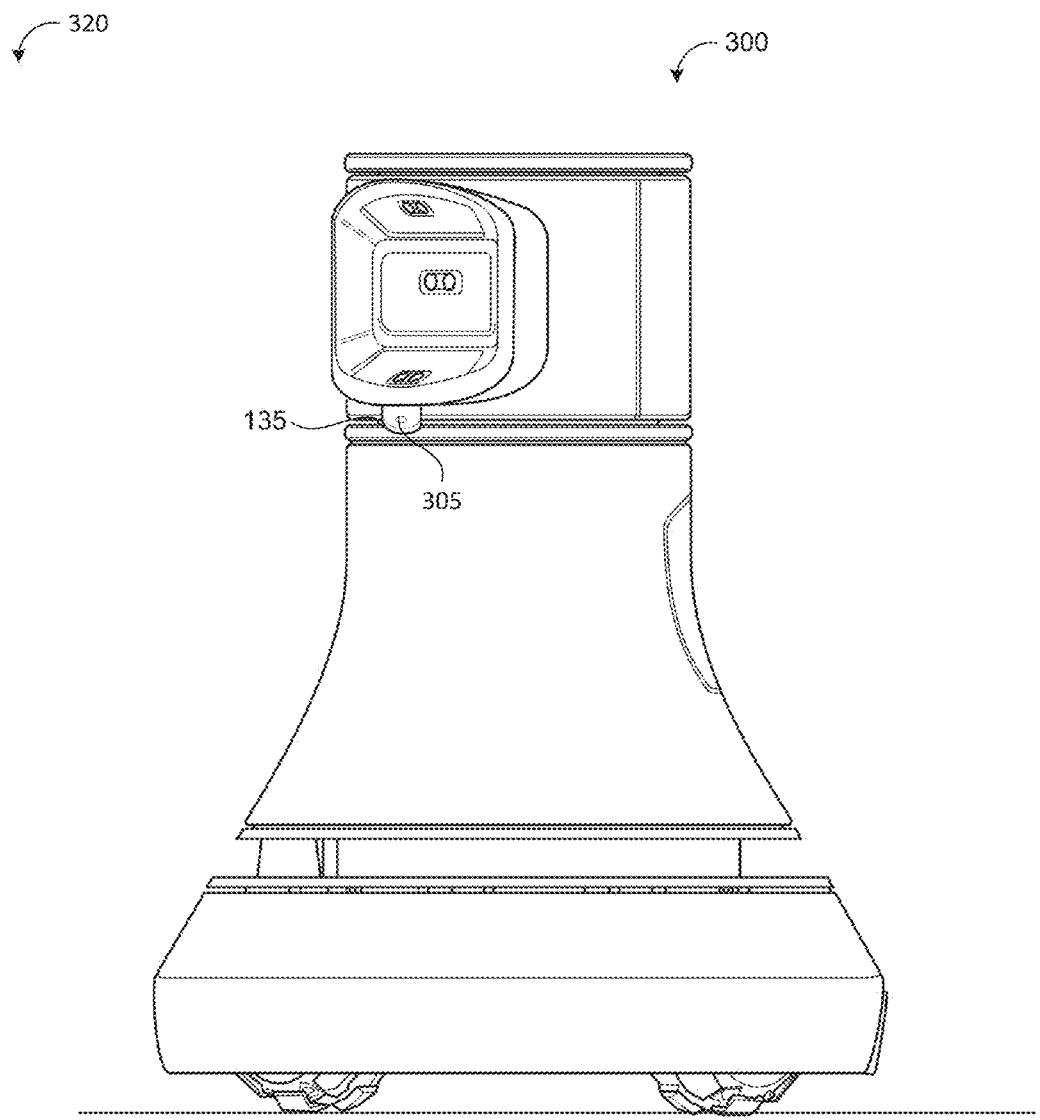
FIG. 3 is a perspective view of a remote presence robot with the coupling of FIG. 2A connected to a camera.

The coupling 135 can include a sensor that can generate images of a room. Referring to FIG. 3, in one implementation, a remote presence robot 300 with a camera 305 attached to the coupling 135 is located within a room 320. The coupling 135 is disposed such that the upper housing points toward the ground. A user can generally use the remote presence robot 300 to observe and interact with an environment at a remote location from the user. The robot 300 can include the drive system, sensor system, navigation system, power system, and controller as described above with respect to FIG. 1B. To interact with the environment, the robot can include a system of end effectors and an audio system. The camera 305 captures images of the room 320 as the robot 300 moves around the room 320. The robot 300 can further include a communications system so that data can be transmitted to a remote computing device and so that data can be transmitted from the remote computing device and received by the communication system. A user can use the communication system to remotely control the robot 300 by sending instructions to the controller of the robot 300. Instructions can include navigation and drive instructions so that the user can remotely navigate the robot 300. The user can further control the rotational position of the coupling 135, which therefore allows the user to orient the camera 305 to various areas of the room 320. The communications system further allows the camera 305 to stream the captured image data to the remote computing device that the user uses to operate the robot 300. The camera 305 visualizes the room 320 for the user so that the user can remotely see features of the room 320. The user can further rotate the camera 305 so that the camera 305 can visualize various parts of the room without re-orienting the robot 300.

The remote presence robot disclosed and illustrated herein may include the systems and features as disclosed in U.S. patent application Ser. No. 11/541,422, filed Sep. 29, 2006 and titled "Companion robot for personal interaction," the disclosure of which is incorporated by reference herein in its entirety and as disclosed in U.S. Pat. No. 8,958,911, filed Jul. 23, 2012 and titled "Mobile Robot," the disclosure of which is incorporated by reference herein in its entirety.

Example 2

Robotic Lawnmower

Figure 4:
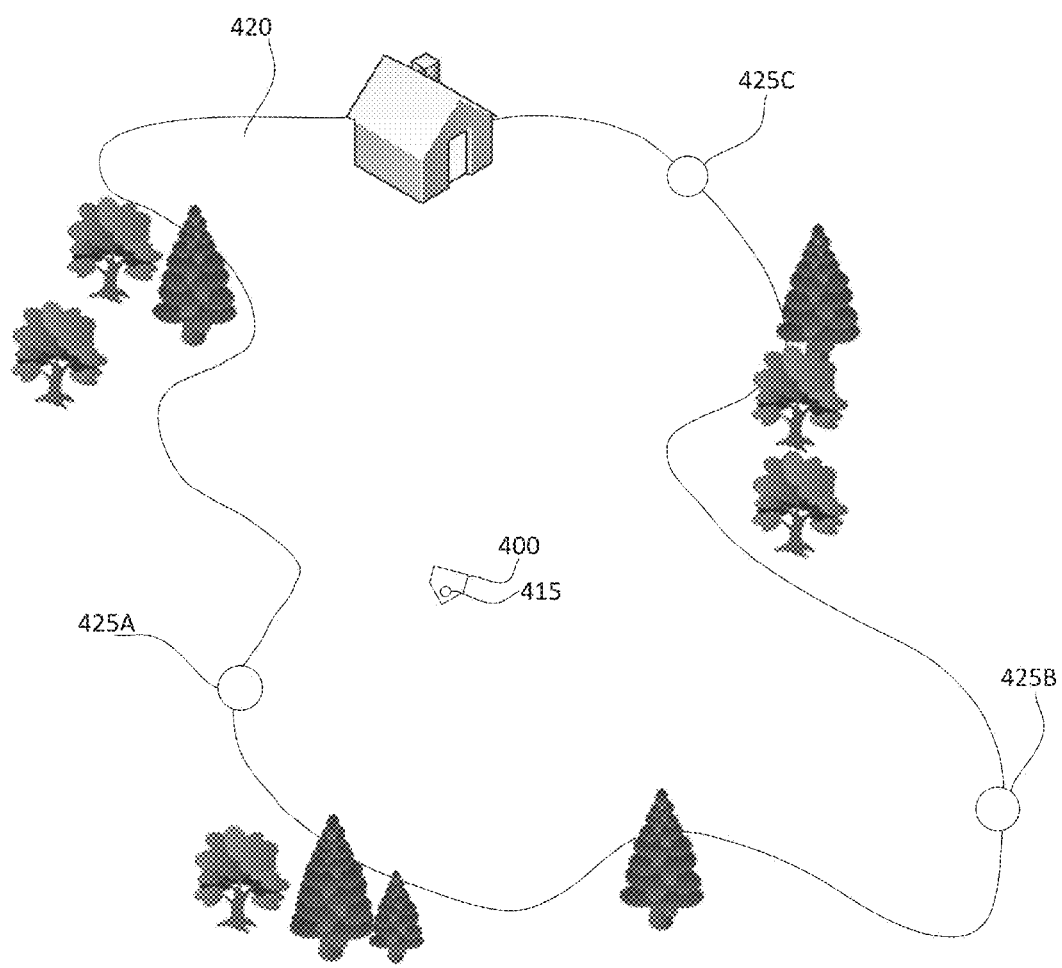
FIG. 4 is a top view of a lawn mowing robot with the coupling of FIG. 2A connected to a radiation transceiver.

The coupling 135 can include a sensor to accurately determine the location of a robot. Referring to FIG. 4, in one implementation, a robotic lawnmower 400 including the coupling 135 (not visible) with a radiation transceiver 415 autonomously navigates around a lawn 420. Boundary markers 425A-C are disposed about the lawn 420. The robotic lawnmower 400 can include the drive system, sensor system, navigation system, power system, and controller as described above with respect to FIG. 1B. The robotic lawnmower 400 further includes a cutting system that allows the robot 400 to autonomously mow the lawn 420. The sensor system of the robot 400 can further include a location estimation system.

In some implementations of the robotic lawnmower 400, the location estimation system is a time-of-flight based system that uses the radiation transceiver 415 to determine a time-of-flight between a boundary marker and the robot 400 to determine the pose (position and orientation) of the entire robot 400. In such implementations, the radiation transceiver 415 is stationary relative to the robot 400. As a result, the robot 400 rotates in order to take on different poses. In some cases, the boundary markers 425A-C send out a signal that the robot lawnmower interprets to determine its position relative to the boundary marker 425A-C. In other examples, the boundary markers are passive and a radiation source on the robot lawnmower 400 emits radiation that reflects off surfaces situated in the lawn 420 and is detected by a radiation detector on the robot. The robot localizes using triangulation to determine the robot position within the boundary. The signals sent between the boundary markers 425A-C and the robot 400 allow the robot 400 to estimate the angles and the distance by calculating time of flight to each of the boundary markers 425A-C, and using trigonometry to calculate the robot's current position. At a given pose, the robot 400 determines its position based on its relative position to the boundary markers 425A-C. In another example, the system can triangulate the distance to an object using a fixed-angle laser pointer and a CMOS imager, with a known baseline between the two. In such examples, the pixel location of the received signal at the imager is indicative of the distance to the object. In some particular examples, the boundary markers 425A-C are wideband transceivers in the 5,925 to 7,250 MHz range or UWB transceivers. The radiation transceiver 415 can also be an UWB transceiver that can detect the boundary markers 425A-C. Other time-of-flight transceivers could be used.

In other implementations of the robotic lawnmower 400, the radiation transceiver 415 rotates relative to the robot 400 using the coupling 135. The location estimation system uses the radiation transceiver 415 to determine a time-of-flight between a boundary marker and the radiation transceiver 415. The radiation transceiver 415, upon detecting the boundary markers 425A-C transmits signals to the controller of the robot 400. Similar to the implementations described above, the localization can use triangulation to determine the position of the radiation transceiver 415 within the boundary. The signals sent between the boundary markers 425A-C and the radiation transceiver 415 in addition to position signals from the optical encoder of the coupling 135 allow the robot 400 to estimate the angles and the distance by calculating time of flight to each of the boundary markers 425A-C, and using trigonometry to calculate the current position of the radiation transceiver 415. Part of process of transmitting data from the radiation transceiver 415 to the controller includes optically transmitting the data through the coupling using the optical transceivers described above with respect to FIG. 2B. The controller processes the signals from both the radiation transceiver 415 and the optical encoder to determine the time-of-flight and the angle of the boundary marker relative to the orientation of the radiation transceiver 415.

The robotic lawnmower disclosed and illustrated herein may include the systems and features as disclosed in U.S. patent application Ser. No. 14/512,098 filed on Oct. 10, 2014 and titled "Robotic Lawn Mowing Boundary Determination," the disclosures of which is incorporated by reference herein in its entirety.

Example 3

Robotic Arm

Figure 5:
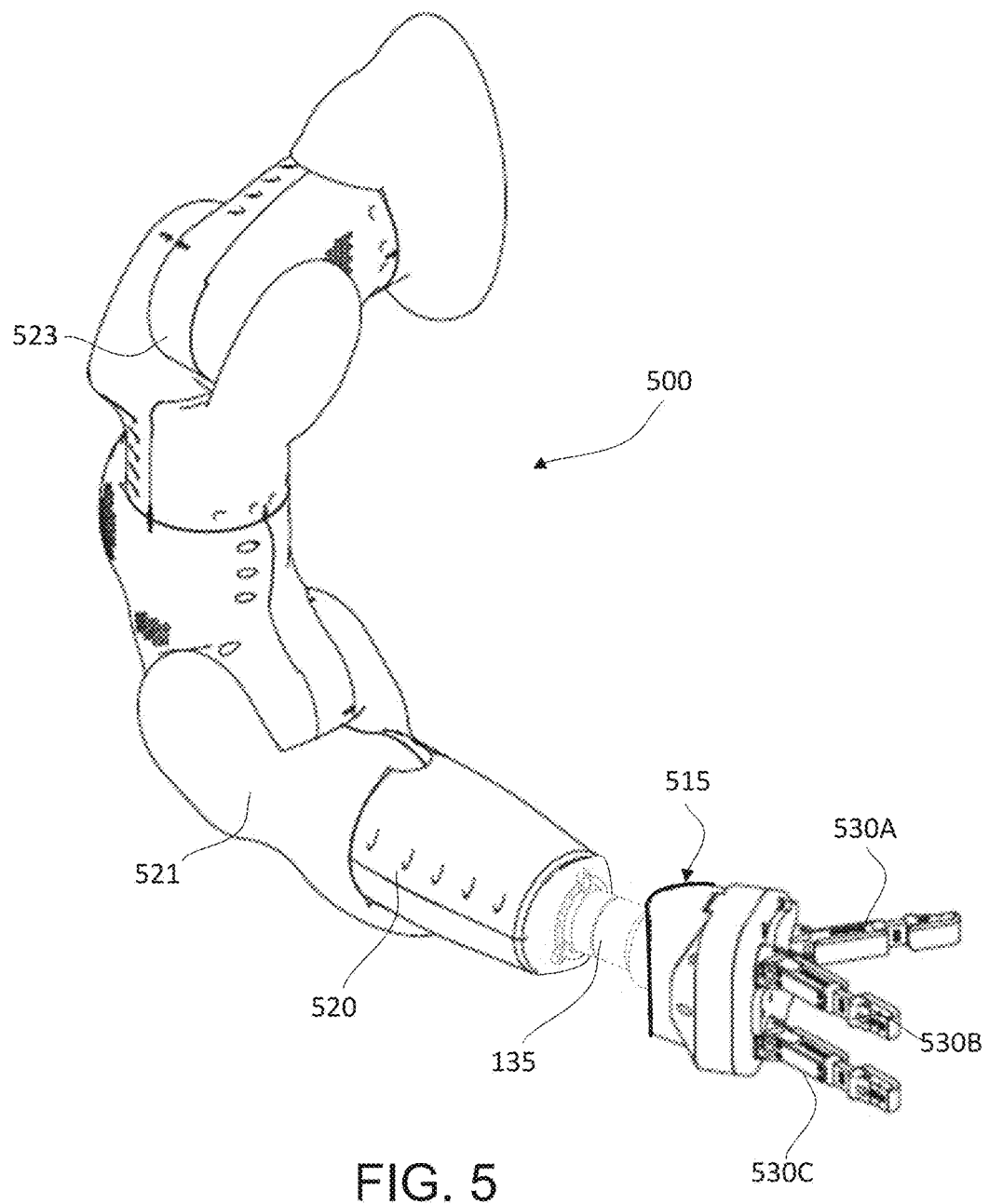
FIG. 5 is a perspective view of a robotic arm that uses the coupling of FIG. 2A as a joint with a robotic hand.

The upper housing of the coupling 135 can include end effectors or actuators that can be controlled by a controller located on a portion of the robot stationary relative to the upper housing of the coupling 135. Referring to FIG. 5, in one implementation, a robotic arm 500 includes the coupling 135 that joins a robotic hand 515 to a robotic forearm 520. The robotic arm 500 can include a power system, a drive system to articulate the joints of the arm (e.g., an elbow joint 521, a shoulder joint 523), and a sensor system (with, e.g., encoders to determine the position of the joints). The robotic hand 515 includes a connector (not shown) that allows the robotic hand 515 to detachably connect to the coupling 135. Robotic fingers 530A-C on the robotic hand 515 grasp and manipulate objects. The robotic hand 515 can have sensors to determine when the hand has grasped an object. For example, the robotic fingers 530A-C can include contact or pressure sensors. The coupling 135 allows the robotic hand 515 to continuously rotate relative to the robotic forearm 520. The optical encoder of the coupling 135 can transmit its position data to a controller operable with the robotic arm 500 such that the controller can determine the rotational position of the robotic hand 515 relative to the robotic forearm 520. Data transmitted through the coupling 135 can therefore include the encoder data as well as the sensor data generated by sensors on the robotic hand 515. The coupling 135 further allows power delivered to the robotic arm 500 to be used to provide power to, for example, sensors on the robotic hand 515 or to actuate robotic fingers 530A-C of the robotic hand 515.

The robotic arm disclosed and illustrated herein may include the systems and features as disclosed in U.S. patent application Ser. No. 14/610,013, filed Jan. 30, 2015 titled "Robotic Arm and Wrist Mechanisms," the disclosure of which is incorporated by reference herein in its entirety.

While a number of examples have been described for illustration purposes, the foregoing description is not intended to limit the scope of the invention, which is defined by the scope of the appended claims. There are and will be other examples and modifications within the scope of the following claims.

What is claimed is:

1. A continuously rotatable coupling, comprising
an input housing rotatably coupled to an output housing by a hollow tube fixed to the output housing and on which tube the input housing rotates, the hollow tube defining a central passage;
two cooperating magnetic flux concentrators disposed about the tube and defining therebetween an annular cavity, the flux concentrators comprising a first flux concentrator fixed to the input housing and a second flux concentrator fixed to the output housing, such that relative rotation of the input and output housings causes relative rotation of the flux concentrators on either side of the annular cavity;
concentric coils disposed within the annular cavity and positioned to permit electrical contact-free power transfer across the coupling, a first of the concentric coils fixed to the input housing and a second of the concentric coils fixed to the output housing;
an optical data emitter fixed to the input housing and positioned to transmit optical signals through the central passage; and
an optical data receiver fixed to the output housing and positioned to receive the optical signals from the input optical data emitter during the relative rotation of the input and output housings.

2. The coupling of claim 1, wherein the first concentric coil is fixed to the first flux concentrator and the second concentric coil is fixed to the second flux concentrator.

3. The coupling of claim 1, wherein the concentric coils are arranged such that a magnetic field induced by an alternating current passing through the second concentric coil will induce an electromotive force within the first concentric coil.

4. The coupling of claim 1, wherein an oscillating waveform passing through the second concentric coil electromagnetically couples the first concentric coil with the second concentric coil.

5. The coupling of claim 1, wherein the optical data transmitter fixed to the input housing comprises a first optical data transceiver, and wherein the optical data transmitter fixed to the output housing comprises a second optical data transceiver, such that the first and second optical data transceivers are configured to pass signals in both directions through the central passage.

6. The coupling of claim 5, wherein the first optical data transceiver is a first emitter and receiver pair, and the second optical data transceiver is a second emitter and receiver pair.

7. The coupling of claim 1, wherein a distance between a surface of the first flux concentrator and a surface of the second flux concentrator is approximately 0.1 mm to 1 mm.

8. The coupling of claim 1, further comprising an encoder coupled to the hollow tube and responsive to rotational displacement of the input housing relative to the hollow tube.

9. The coupling of claim 1, wherein the optical data transmitter comprises an infrared emitting diode.

10. The coupling of claim 1, wherein the rotatable coupling comprises a rotatable joint of an articulating arm.

11. A continuously rotatable sensor turret, comprising:
the rotatable coupling of claim 1, with the output housing fixed to a base; and
a directional sensor carried by the input housing and having an active sense window that sweeps about an environment as the coupling is rotated,
wherein the concentric coils are configured to provide electrical power to the sensor during rotation of the coupling, and
wherein the optical data transmitter and receiver are configured to transmit a signal from the sensor across the central passage during rotation of the coupling.

12. The coupling of claim 11, further comprising a directional beam transmitter carried by the input housing and configured to emit a sensing signal into the environment while the coupling rotates, wherein the sensor is responsive to reflections of the emitted sensing signal.

13. The coupling of claim 12, wherein the beam transmitter comprises a laser.

14. The coupling of claim 11, further comprising a power source mounted on a flyback converter board disposed in the output housing, the flyback converter board configured to deliver power across the coupling to the directional sensor.

15. The coupling of claim 11, wherein comprising a radar transmitter carried by the input housing and configured to emit a radar signal into the environment while the input housing rotates, wherein the sensor is responsive to reflections of the emitted radar signal.

16. The coupling of claim 11, wherein the directional sensor is a camera configured to receive image data about the environment as the coupling is rotated.

17. The coupling of claim 11, wherein the sensor is a radiation transceiver.

18. The coupling of claim 1, wherein the rotatable coupling is configured to be disposed on an autonomous robot.

19. The coupling of claim 1, wherein a controller of the autonomous robot controls movement of the autonomous robot based on the optical signals.

20. An autonomous robot, comprising:
a chassis;
a continuously rotatable sensor turret disposed on the chassis, comprising:
   a continuously rotatable coupling, comprising:
      an input housing rotatably coupled to an output housing by a hollow tube fixed to the output housing and on which tube the input housing rotates, the hollow tube defining a central passage,
      two cooperating magnetic flux concentrators disposed about the tube and defining therebetween an annular cavity, the flux concentrators comprising a first flux concentrator fixed to the input housing and a second flux concentrator fixed to the output housing, such that relative rotation of the input and output housings causes relative rotation of the flux concentrators on either side of the annular cavity,
      concentric coils disposed within the annular cavity and positioned to permit electrical contact-free power transfer across the coupling, a first of the concentric coils fixed to the input housing and a second of the concentric coils fixed to the output housing,
      an optical data emitter fixed to the input housing and positioned to transmit optical signals through the central passage, and
      an optical data receiver fixed to the output housing and positioned to receive the optical signals from the input optical data emitter during the relative rotation of the input and output housings;
   a directional sensor carried by the input housing and having an active sense window that sweeps about an environment as the coupling is rotated; and
   a controller configured to control movement of the autonomous robot based on signals received from the directional sensor,
wherein the concentric coils are configured to provide electrical power to the sensor during rotation of the coupling, and
wherein the optical data transmitter and receiver are configured to transmit a signal from the sensor across the central passage during rotation of the coupling.

* * * * *